No. 878,238. PATENTED FEB. 4, 1908.
G. D. ROLLINS.
METALLIC PACKING.
APPLICATION FILED MAY 4, 1907.
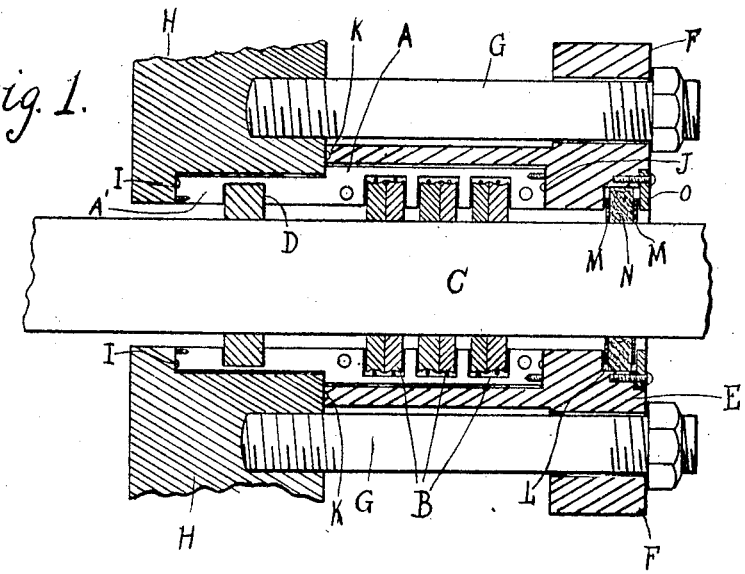
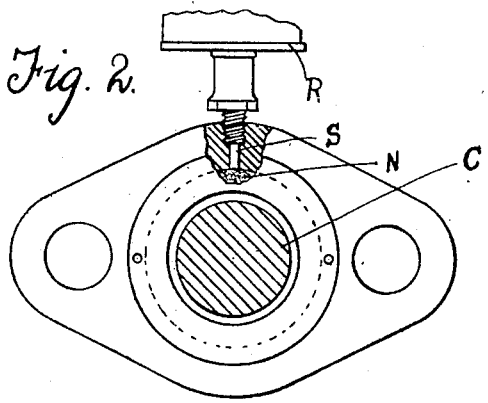
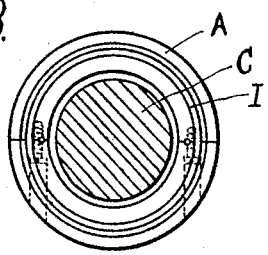
WITNESSES
INVENTOR
George D. Rollins
BY
ATTORNEY

UNITED STATES PATENT OFFICE.

GEORGE D. ROLLINS, OF PHILADELPHIA, PENNSYLVANIA.

METALLIC PACKING.

No. 878,238.      Specification of Letters Patent.      Patented Feb. 4, 1908.

Application filed May 4, 1907. Serial No. 371,829.

*To all whom it may concern:*

Be it known that I, GEORGE D. ROLLINS, a citizen of the United States, residing at Philadelphia, county of Philadelphia, and State of Pennsylvania, have invented a certain new and useful Improvement in Metallic Packing, of which the following is a specification.

My invention relates to a new and useful improvement in metallic packing, and has for its object to so construct such a packing that it will be especially adapted for the piston and valve rods of locomotives and the like and provide for the application of the packing to the cylinder or steam-chest of a locomotive, the split casing being entirely inclosed within an outer casing and the usual recess formed in the head of the cylinder and steam-chest; and further to thoroughly oil the piston or valve rod and prevent the passage of dust or grit to the rings of the packing.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a section of my improved packing. Fig. 2, an end view thereof, the piston rod being in section, and a portion of the outer casing broken away to show the oil passage leading from the oil-cup to the oil-chamber. Fig. 3, an end view of the split casing.

In carrying out my invention as here embodied, A represents the split casing, which has a reduced extension A' formed therewith, and within this casing are formed suitable grooves for the reception of the packing rings B, adapted to fit with spring pressure against the piston or valve rod C, and in the extension is formed a groove D for the purpose hereinafter explained.

E represents the outer casing, which is adapted to fit over and inclose the split casing, and this outer casing has formed therewith a flange F through which the bolts G are adapted to pass, the inner ends of said bolts being threaded into the head of the cylinder or steam-chest indicated at H, thus securing the outer casing in place.

The reduced portion A' of the split casing is adapted to pass into the usual recess formed in the head of the cylinder or steam-chest, and in order that this split casing may be steam packed, a soft metal wire I is placed in a groove formed in the end thereof, and a corresponding wire J is placed in a groove formed in the opposite end of the split casing so that when the outer casing is bolted in place these two wires will be compressed against the opposite surfaces, and thus form a steam tight joint.

In order that no steam may escape from the outer casing, a soft metal wire K is also located in a groove formed in the inner end of the outer casing, so that when this casing is bolted in place this wire will also be compressed against the head of the cylinder or steam-chest, and thus make a steam tight joint at this point.

In the front face of the outer casing is formed a recess L, and in this recess is located the two washer disks M, through each of which passes the rod C with a ringing fit, and between these disks is located a fibrous packing N such as waste or the like, and these disks and packing are held in place by a plate O which is let in flush with the outer casing and held in place by suitable screws.

The disks M are of less diameter than the recess in which they are placed so as to allow a certain leeway in the sidewise movement of these disks to compensate for any sidewise movement of the rod which may take place.

Located in the groove D is a ring P which may be made of bronze or other suitable metal, adapted to support the rod and prevent it from sagging. This is an important feature in this class of packings as it prevents the packing rings from being forced out of alinement and thus saves them from undue wear. This ring is preferably made in two halves, so as to be readily fitted to the rod.

In order that the rod may be lubricated, an oil cup R of any suitable design is threaded into the outer casing, as clearly shown in Fig. 2, so as to constantly feed oil through the passage S to the fibrous packing N, thus keeping this packing saturated with oil, which will constantly be applied to the rod as the latter moves back and forth, and as there is a certain quantity of oil in the cylinder or steam-chest the latter will be carried to the fibrous packing Q and thus applied to the rod from the inner end of the split casing.

From this description it will be seen that my improved packing may be readily applied to a piston or valve rod by removing the ordinary stuffing-box, placing the reduced portion A' of the split casing in the recess formed in the head of the cylinder or steam-chest and bolting the outer casing around the protruding end of the split casing, and when thus applied the rings B will prevent any escape of steam around the rod, and the packing N will prevent the admission of dust or grit to the packing rings, as this fibrous packing will constantly remain in contact with the rod, wiping it clear of dirt or grit, while applying oil thereto.

Having thus fully described my invention, what I claim as new and useful, is—

1. In a metallic packing the combination of a split casing of two diameters, the reduced portion thereof being adapted to fit within the recess formed in the cylinder head, packing rings located in grooves formed in the split casing, a groove formed in the reduced portion of said casing for the reception of a metal supporting ring, an outer casing adapted to fit around the enlarged portion of the split casing and hold said split casing in place, a recess formed in the outer face of the outer casing, fibrous material located within said recess and a plate adapted to hold said fibrous material in place, as specified.

2. In a metallic packing the combination of a split casing of two diameters, the reduced portion thereof being adapted to fit within a recess formed in the cylinder head, packing rings located in grooves formed in the split casing, a groove formed in the reduced portion of said casing for the reception of a split supporting ring, an outer casing adapted to fit around the enlarged portion of the split casing and hold said split casing in place, a recess formed in the outer face of the outer casing, fibrous material located within said recess, a plate adapted to hold said fibrous material in place and means for feeding oil to said fibrous material, as specified.

3. In a metallic packing, a split casing of two diameters, the reduced portion being adapted to fit within a recess formed in the head of the cylinder, said casing having internal grooves for the reception of packing rings, as specified.

4. In a metallic packing the combination of a split casing of two diameters, the outer casing adapted to fit over and secure said split casing in place, a recess formed in the outer face of the outer casing, two washer disks through which the rod may slide, an absorbent material located between the two disks and a ring for securing said disks and absorbent material in place, as specified.

5. In a metallic packing the combination of a split casing of two diameters, grooves formed in the enlarged portion of the casing for the reception of packing rings, a groove formed in the reduced portion of the casing a split supporting ring, fitted within the last named groove, an outer casing adapted to fit over and secure said split casing in place, a recess formed in the outer face of the outer casing, two washer disks through which the rod may slide, an absorbent material located between the two disks and a ring for securing said disks and absorbent material in place, as specified.

6. In a metallic packing, a split casing of two diameters, the reduced portion being adapted to fit within a recess formed in the head of the cylinder or steam chest, said casing having internal grooves for the reception of packing rings and an outer casing adapted to inclose the inner casing and be bolted in place, as specified.

7. In a metallic packing, a casing of two diameters, the reduced portion being adapted to fit within a recess formed in the head of the cylinder or steam chest, said casing having internal grooves for the reception of packing rings and an outer casing adapted to inclose the inner casing and be bolted in place, as specified.

In testimony whereof, I have hereunto affixed my signature in the presence of two subscribing witnesses.

GEORGE D. ROLLINS.

Witnesses:
JOSEPH C. SMITH,
S. M. GALLAGHER.